United States Patent [19]
Pinto et al.

[11] Patent Number: 5,754,572
[45] Date of Patent: May 19, 1998

[54] MIRRORLESS, DISTRIBUTED-FEEDBACK, ULTRAVIOLET, TUNABLE, NARROW-LINEWIDTH, SOLID STATE LASER

[75] Inventors: Joseph F. Pinto, Laurel; Leon Esterowitz, Springfield, both of Md.

[73] Assignee: The United States of America as represented by the Secretary of the Navy., Washington, D.C.

[21] Appl. No.: 751,062
[22] Filed: Nov. 15, 1996
[51] Int. Cl.⁶ .................................................. H01S 3/10
[52] U.S. Cl. .................. 372/20; 372/5; 372/70; 372/102
[58] Field of Search .................. 372/5, 20, 41, 372/70, 96, 102

[56] References Cited

U.S. PATENT DOCUMENTS 5,487,079  1/1996  Esterowitz et al. ................ 372/20

Primary Examiner—Rodney B. Bovernick
Assistant Examiner—Robert E. Wise
Attorney, Agent, or Firm—Thomas E. McDonnell; George Jameson

[57] ABSTRACT

A mirrorless, distributed-feedback (DFB), ultraviolet, tunable, narrow-linewidth, solid state laser for remote sensing and medical applications is disclosed. Optical pumping in the DFB laser is accomplished using a frequency quadrupled, 10 Hz., Q-switched, Nd:YAG laser operating at 266 nm. The pump beam is diffracted off a grating (2400 grooves per mm.) into two parts. The two beams are subsequently recombined at the side face of the Ce:doped crystal (8 mm×8 mm×30 mm) at an angle of about 2θ (about 81 degrees). The resulting spatially periodic excitation within the Ce-doped gain medium due to the interfering pump beams determines the operating wavelength of the DFB laser.

15 Claims, 2 Drawing Sheets

5,754,572

MIRRORLESS, DISTRIBUTED-FEEDBACK, ULTRAVIOLET, TUNABLE, NARROW-LINEWIDTH, SOLID STATE LASER

BACKGROUND OF THE INVENTION

1. Field of the Invention

The present invention relates to solid state lasers and particularly to a mirrorless, distributed-feedback, ultraviolet, tunable, narrow-linewidth solid state laser.

2. Description of the Related Art

Cerium-doped LiCAF and LiSAF lasers have been fabricated using laser cavity mirrors in transverse and longitudinally pumped configurations. However, there is currently no simple, narrow-linewidth, tunable, solid state cerium (Ce) laser system that operates without laser cavity mirrors.

SUMMARY OF THE INVENTION

It is therefore an object of the invention to provide a cerium laser that operates without mirrors and with subangstrom linewidth.

Another object of the invention is to provide a mirrorless, ultraviolet, tunable, narrow-linewidth, solid state laser.

Another object of the invention is to provide a mirrorless, distributed-feedback, ultraviolet, tunable, narrow-linewidth, solid state laser.

A further object of the present invention is to provide a mirrorless, distributed-feedback, tunable, narrow-linewidth laser in Ce:LiCAF/LiSAF crystals.

These and other objects of the invention are achieved by providing a mirrorless, distributed-feedback (DFB), ultraviolet, tunable, narrow-linewidth, solid state laser. Optical pumping is accomplished using a frequency quadrupled, 10 Hz., Q-switched, Nd:YAG laser operating at 266 nm. The pump beam is diffracted off a grating (2400 grooves per mm.) into two parts (+1 and −1 orders). The two beams are subsequently recombined at the side face of the Ce:doped crystal (8 mm×8 mm×30 mm) at an angle of about 2 θ (about 81 degrees). The resulting spatially periodic excitation within the Ce gain medium due to the interfering pump beams creates a periodic variation of the index of refraction. This periodic index variation behaves as a grating which provides feedback and gain necessary for laser oscillation. The operating wavelength of the DFB laser 10 is determined by the grating period.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
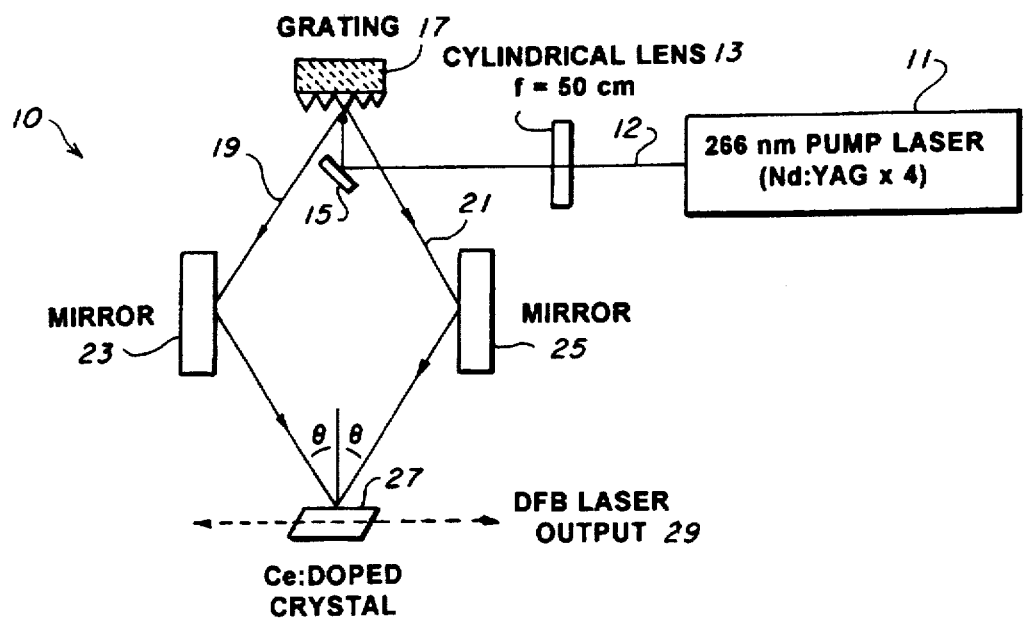
FIG. 1 is a schematic diagram of an exemplary preferred embodiment of the mirrorless, distributed-feedback (DFB), ultraviolet, tunable, narrow-linewidth, solid state laser of the invention.

Referring now to the drawings, FIG. 1 illustrates a schematic diagram of an exemplary preferred embodiment of the mirrorless, ultraviolet, tunable, narrow-linewidth, solid state, distributed-feedback (DFB) laser 10 of the invention.

As shown in FIG. 1, a pump laser 11 produces an optical pump beam 12 at about 266 nm. Other pump lasers that could each be used in place of the quadrupled Nd:YAG pump laser 11 are quadrupled Nd:YVO$_4$ and Nd:YLF pump lasers and any UV pump source that produces an output wavelength that is within the absorption band of trivalent cerium doped colquiirites. Optical pumping of a 266 nm pump beam can be accomplished using a frequency quadrupled, 10 Hz, Q-switched Nd:YAG pump laser 11 operating at about 266 nm. The pump laser 11 is comprised of an exemplarly Nd:YAG laser operating at 1.064 microns followed by two frequency doublers. A first frequency doubler is a nonlinear crystal (not shown), such as KDP or KD*P, which is responsive to the 1.064 micron output of the Nd:YAG laser for generating 532 nm radiation or frequency doubled Nd:YAG output. A second frequency doubler is another nonlinear crystal (not shown), such as an ADP crystal, which frequency doubles the 532 nm radiation to 266 nm ultraviolet radiation or frequency quadrupled Nd:YAG output 12. Another combination of nonlinear crystals that could be used in the 266 nm pump laser 11 as the first and second frequency doublers are LBO and BBO crystals to obtain a frequency quadrupling of the 1.064 micron output of the Nd:YAG laser.

The 266 nm pump beam output 12 from the pump laser 11 is focused by an exemplary 50 centimeter (cm) focal length cylindrical lens 13 which focuses the pump beam from the pump laser 11 into a more intense mode volume inside a cerium-doped (Ce-doped) crystal 27 (to be discussed). More specifically, the cylindrical lens 13 focuses the pump beam 12 into a line image, or a long thin line along a focal line in the Ce-doped crystal 27 to intensify the pump beam 12 to achieve lasing in the Ce-doped crystal 27. The Ce-doped crystal 27, which can be an exemplary Ce$^{3+}$:doped LiCAF host crystal or an exemplary Ce$^{3+}$:doped LiSAF host crystal, is placed at the focal point or focal line of the cylindrical lens 13. Other host crystals that can be doped with trivalent cerium are LiSCAF and LiSGAF. Each of these above-named host crystals can be doped with a concentration of cerium from 0.01% to 0.1% and preferably with a concentration of about 0.1%.

The ultraviolet (UV) pump beam 12 passing through the cylindrical lens 13 is reflected off a flat mirror 15 to an ultraviolet (UV) grating 17. The use of the UV grating 17 is basically just a technique for splitting the UV beam into two pump beams. The ultraviolet grating 17 is preferrably implemented to have an exemplary 2400 grooves per millimeter along the length of the grating 17. The grating 17 diffracts the pump beam into two substantially identical beams (±1 orders) 19 and 21. These two pump beams 19 and 21 are respectively reflected off of highly reflective mirrors 23 and 25 and are recombined along the length of the upper side face (as shown in FIG. 1) of the Ce-doped crystal 27 (which has exemplary dimensions of 8 mm×8 mm×30 mm) at an exemplary intersecting angle of 2θ, which in this description is equal to about 81 degrees.

The end faces of the Ce:doped crystal 27 are cut and polished at Brewster's angle to avoid the effects of spurious feedback. The resulting spatially periodic excitation within the gain medium of the Ce:doped crystal 27 due to the interfering pump beams 19 and 21 determines the operating wavelength, $\lambda_L$, of the DFB laser 10 according to the relation $\lambda_L = \lambda_p n / m \sin\theta$, where $\lambda_p$ is the pump wavelength, n is the crystal index of refraction at the lasing wavelength, and m is the lasing order of the DFB laser 10.

Figure 2:
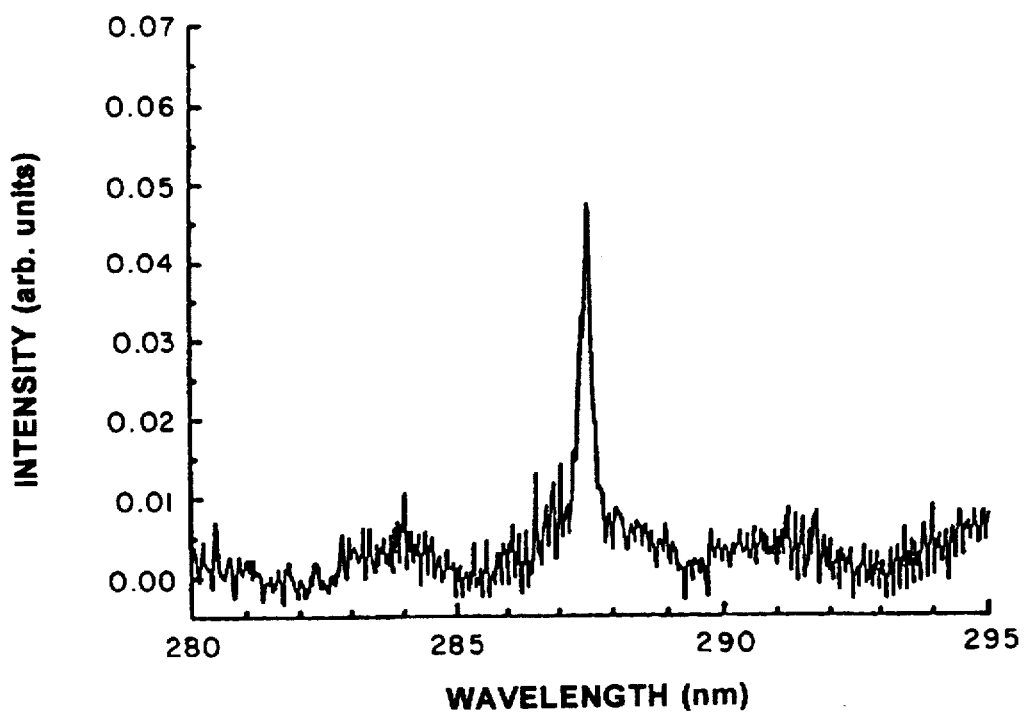
FIG. 2 illustrates the output spectrum of the Ce:LiCAF DFB crystal laser 27 of FIG. 1.

The reason for splitting the pump beam 12 into two beams 19 and 21 is that such beams 19 and 21 are required to interfere with each other at the focal point of the cylindrical lens 13 inside the Ce-doped crystal 27 in order to produce a transient Bragg grating inside the Ce-doped crystal 27 which transient grating is going to cause lasing in the crystal 27. When the two pump beams 19 and 21 intersect at an angle of about 2θ they will form a grating 31, as shown in FIG. 2, in the cerium-doped crystal 27 of FIG. 1. The resulting spatially periodic excitation within the cerium-doped crystal 27 due to the interferring pump beams 19 and 21 determines the operating wavelength of the DFB laser 10.

In lab experiments, DFB laser action was observed in second order (m=2) for each of the $Ce^{3+}$:doped LiCAF and $Ce^{3+}$:doped LiSAF lasers. For an incident pump energy of 5 mJ at 266 nm, a DFB laser beam output 29 emerges from each end of the Ce:doped crystal 27, with output energies of several microjoules.

The spectral output of the $Ce^{3+}$:LiCAF DFB laser 27 at 287.5 nm is shown between 280 nm and 295 nm in FIG. 2. At an operating wavelength of 287.5 nm, the measured linewidth of the DFB laser 27 output 29 was narrower than the 0.7 Å resolution of the spectromer used in the lab.

Figure 3:
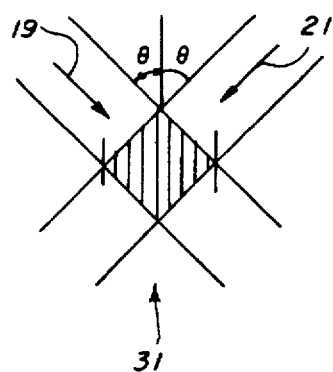
FIG. 3 illustrates a transient Bragg grating that is formed inside the Ce-doped (cerium-doped) crystal 27 when the two pump beams 19 and 21 interfere with each other inside the crystal 27.

FIG. 3 illustrates the transient Bragg grating 31 that is formed inside the Ce-doped crystal 27 when the two pump beams 19 and 21 interfere with each other inside the crystal 27. This grating 31 is a function of the intersection angle 2θ of the two pump beams 19 and 21, as also shown in FIG. 1, and the writing wavelength. The writing wavelength is the pump laser wavelength, which is shown in FIG. 1 as 266 nm. The spacing in the grating is a function of the writing wavelength and the intersection angle 2θ between the two pump beams 19 and 21. When these two pump beams 19 and 21 interfere inside the Ce-doped crystal 27, their electrical fields will coherently add and subtract to produce an intensity modulated pattern inside the crystal 27. Since the two pump beams 19 and 21 interfere and there is some spatial modulation of the intensity, there will be a spatial modulation of the gain inside of the Ce-doped crystal 27.

As stated before, the combination of the grating 17 and the two mirrors 23 and 25 can generate the two pump beams 19 and 21 which will interfere at a given angle of 2θ to generate an intensity modulation inside the Ce:doped crystal 27 as a function of distance along the crystal 27.

Figure 4:
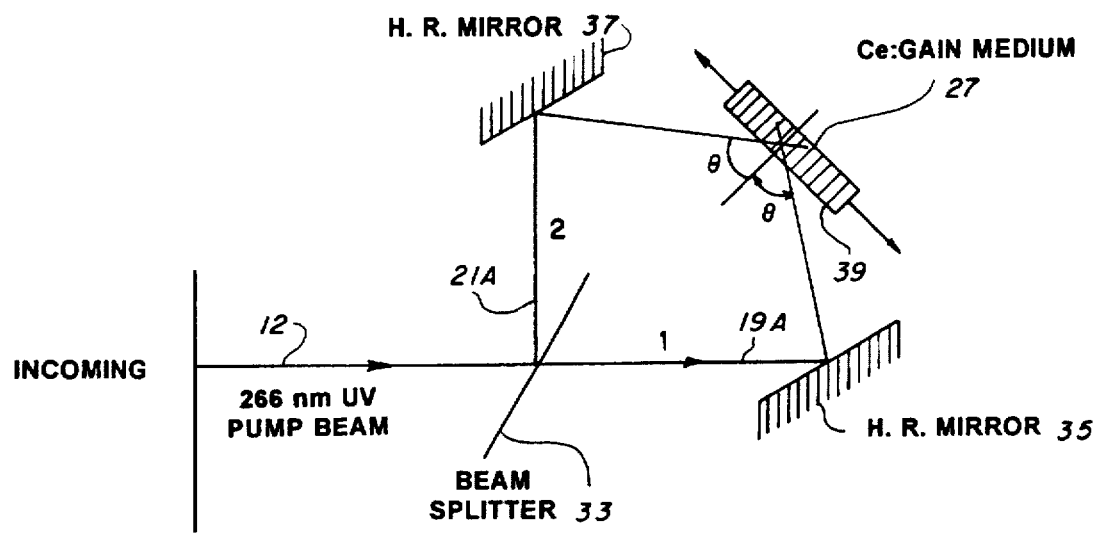
FIG. 4 illustrates a beam splitter that can be substituted for some of the components in FIG. 1 to generate the two interfering pump beams to generate a spatially modulated intensity inside the crystal 27.

It should be noted at this time that in FIG. 1 the combination of the grating 17 and the mirrors 15, 23 and 25 can be replaced by a second configuration which includes a single beam splitter 33, as shown in FIG. 4. The only requirement of such a second configuration is that it split the pump laser beam 12 into two interfering pump beams which would subsequently interfere inside a Ce-doped gain medium and generate a spatially modulated intensity inside the Ce-doped gain medium.

As shown in FIGS. 1 and 4, the 266 nm pump beam 12 that is focused by the cylindrical lens 13 passes to a beam splitter 33, which substantially divides the beam into two pump beams 19A and 21A. Pump beam 19A passes through the beam splitter 33, and is reflected off a high reflecting mirror 35 to a Ce-doped gain medium 27A, similar to the Ce-doped crystal 27 of FIG. 1. On the other hand, the pump beam 21B is reflected off the beam splitter 33, and is reflected off a high reflecting mirror 37 to the Ce-doped gain medium 27A. The pump beams 19A and 21B are recombined along the length of the side face 39 of the Ce-doped gain medium 27A at the exemplary intersecting angle of 2θ to interfere with each other at the focal point of the cylindrical lens 13 inside the Ce-doped gain medium 27A in order to produce a transient Bragg grating (FIG. 3) inside the Ce-doped gain medium 27A which transient grating causes lasing in the medium 27A.

Figure 5:
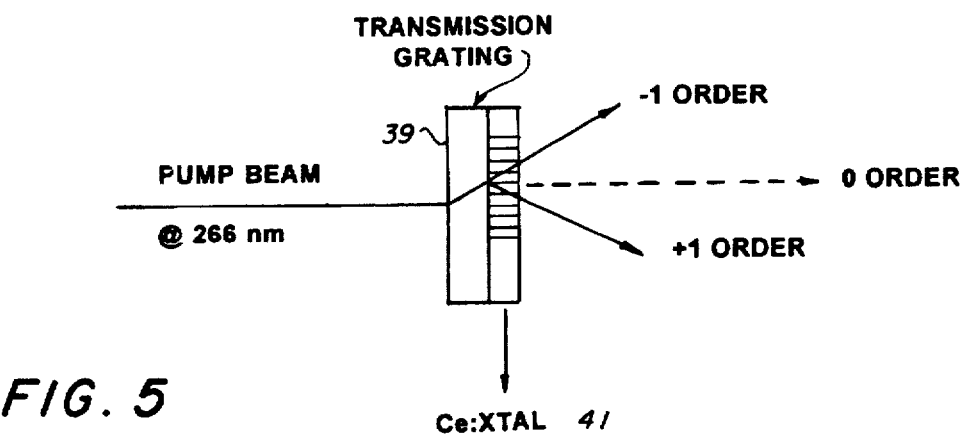
FIG. 5 illustrates a transmission grating that can be substituted for some of the components in FIG. 1 to generate the two interfering pump beams to generate a spatially modulated intensity inside the crystal 27.

FIG. 5 illustrates another configuration of a mirrorless Ce-doped crystal laser which utilizes a transmission grating 39 with a Ce crystal 41 adjacent to it.

For each of the embodiments of FIGS. 1, 3, 4 and 5, the wavelength of each of the mirrorless DBF lasers can be tuned and changed by changing the intersection angle between the two interfering pump beams.

Therefore, what has been described in a preferred embodiment of the invention is a mirrorless, distributed-feedback (DFB), ultraviolet, tunable, narrow-linewidth, solid state laser for remote sensing and medical applications. Optical pumping in the DFB laser is accomplished using a frequency quadrupled, 10 Hz., Q-switched, Nd:YAG laser operating at 266 nm. The pump beam is diffracted off a grating (2400 grooves per mm.) into two parts. The two beams are subsequently recombined at the side face of a Ce-doped crystal (8 mm×8 mm×30 mm) at an angle of about 2θ (about 81 degrees). The resulting spatially periodic excitation within the Ce-doped gain medium due to the interferring pump beams determines the operating wavelength of the DFB laser.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A mirrorless, ultraviolet, tunable, narrow-linewidth, solid state laser comprising:

a cerium-doped crystal in which the cerium has an absorption band within the cerium-doped crystal;

a pump laser that produces a pump beam having an output wavelength that is within the absorption band of said cerium within said cerium-doped crystal;

a cylindrical lens for focusing said pump beam into a line image along a focal line in said cerium-doped crystal; and means for splitting said pump beam into two separate substantially identical beams which substantially recombine and interfere with each other at an intersection angle of about 2θ along said focal line in said cerium-doped crystal in order to produce a transient grating inside said crystal to cause lasing;

said cerium-doped crystal being responsive to the interfering pump beams for producing a resulting spatially periodic excitation within the cerium-doped crystal due to the interferring pump beams to determine the operating wavelength of the DFB laser.

2. The mirrorless, ultraviolet, tunable, narrow-linewidth, solid said laser of claim 1 wherein:

said crystal is doped with a concentration of cerium from about 0.01% to about 0.1%.

3. The mirrorless, ultraviolet, tunable, narrow-linewidth, solid state laser of claim 1 wherein:

said crystal is doped with a concentration of about 0.1%.

4. The mirrorless, ultraviolet, tunable, narrow-linewidth, solid state laser of claim 1 wherein:

said cerium-doped crystal is a cerium-doped LiCAF crystal.

5. The mirrorless, ultraviolet, tunable, narrow-linewidth, solid state laser of claim 1 wherein:

said cerium-doped crystal is a cerium-doped LiSAF crystal.

6. The mirrorless, ultraviolet, tunable, narrow linewidth, solid state laser of claim 5 wherein said frequency quadrupled neodymium YAG laser comprises:

a neodymium YAG laser for producing a radiation output at about 1064 nm;

a first frequency doubler responsive to the 1064 nm output from said neodymium YAG laser laser for generating 532 nm radiation; and a second frequency doubler responsive to the 532 nm radiation from said first frequency doubler for generating a 266 nm pump beam.

7. The mirrorless, ultraviolet, tunable, narrow-linewidth, solid state laser of claim 6 wherein:

said first frequency doubler is selected from the group consisting of KDP and KD*P nonlinear crystals; and said second frequency doubler is an ADP nonlinear crystal.

8. The mirrorless, ultraviolet, tunable, narrow-linewidth, solid state laser of claim 6 wherein:

said first frequency doubler is an LBO crystal; and said second frequency doubler is a BBO crystal.

9. The mirrorless, ultraviolet, tunable, narrow-linewidth, solid state laser of claim 1 wherein:

said cerium-doped crystal is a cerium-doped LiSCAF crystal.

10. The mirrorless, ultraviolet, tunable, narrow-linewidth, solid state laser of claim 1 wherein:

said cerium-doped crystal is a cerium-doped LiSGAF crystal.

11. The mirrorless, ultraviolet, tunable, narrow-line width, solid state laser of claim 1 wherein:

said pump laser produces output radiation at a wavelength of about 266 nm.

12. The mirrorless, ultraviolet, tunable, narrow-linewidth, solid state laser of claim 1 wherein said pump laser comprises:

a frequency quadrupled neodymium YAG laser.

13. The mirrorless, ultraviolet, tunable, narrow-linewidth, solid state laser of claim 1 wherein said splitting means comprises:

grating means for splitting said pump beam into two separate beams; and first and second reflective means for respectively reflecting said two beams at said intersection angle of about $2\theta$ along said focal line in said cerium-doped crystal.

14. The mirrorless, ultraviolet, tunable, narrow-linewidth, solid state laser of claim 1 wherein said splitting means comprises:

a transient grating.

15. The mirrorless, ultraviolet, tunable, narrow-linewidth, solid state laser of claim 1 wherein said splitting means comprises:

a transmission gating responsive to said pump beam for splitting said pump beam into two separate pump beams, said transmission grating being disposed adjacent to said cerium-doped crystal to cause said two pump beams to interfere with each other within the cerium-doped crystal.

* * * * *